3,730,890
FIRE RETARDANT COMPOSITION AND
METHOD OF PRODUCTION
Kenneth E. Nelson, Phoenix, Ariz., assignor to Early
California Industries Inc.
Continuation of abandoned application Ser. No. 36,064,
May 11, 1970. This application Dec. 3, 1971, Ser.
No. 204,724
Int. Cl. A62c 3/02; A62d 1/00
U.S. Cl. 252—7                                   1 Claim

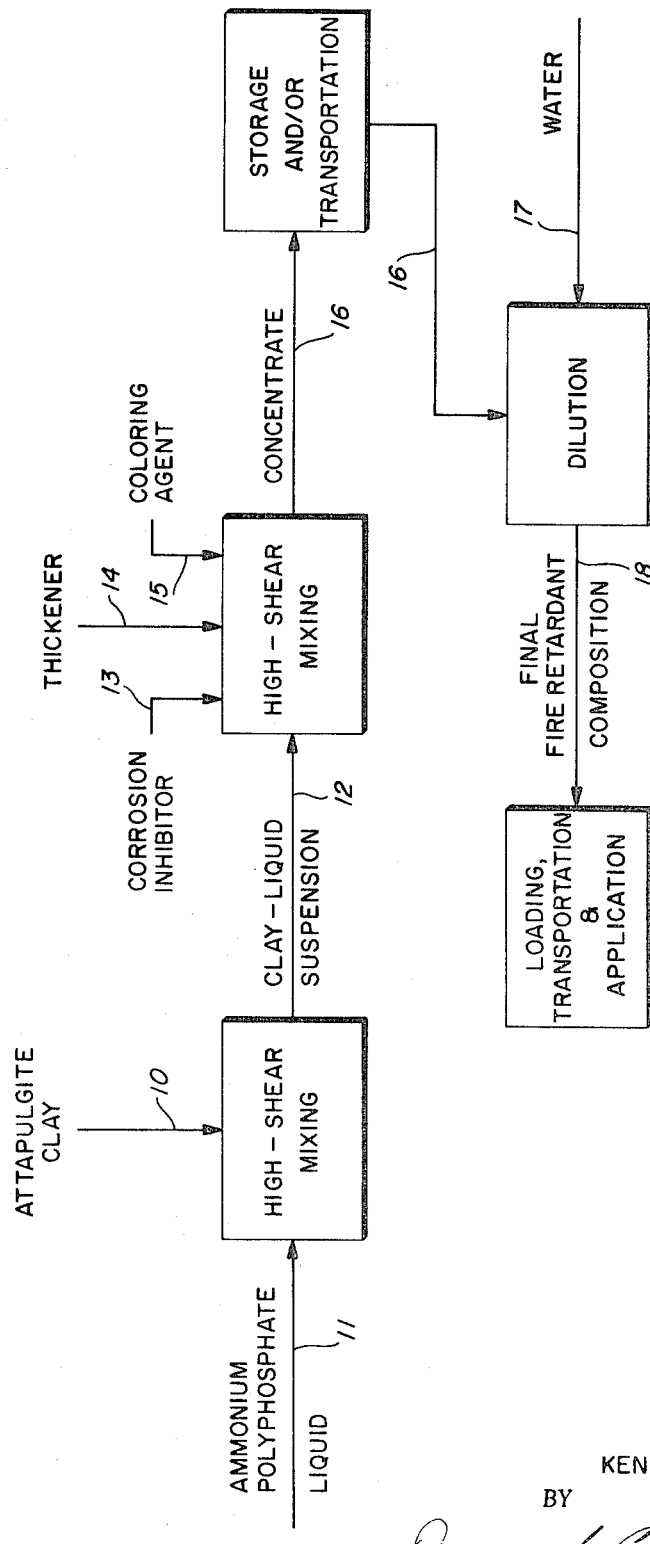

ABSTRACT OF THE DISCLOSURE

Attapulgite clay is suspended in liquid ammonium polyphosphate to form a concentrate. Various components such as corrosion inhibitors, gum thickeners and coloring agents which are insoluble in the polyphosphate liquid are carried and maintained in suspension by the attapulgite clay. Upon dilution of the concentrate with water as required to produce a retardant composition with the desired viscosity, the components are uniformly dispersed and/or dissolved in the final fire-retardant composition. The composition is adapted for both aerial and ground application.

---

This is a continuation of application Ser. No. 36,064, filed May 11, 1970, now abandoned.

This invention relates to fire-retardant compositions and methods for production thereof.

In a further aspect, the invention concerns a novel concentrate useful in the preparation of fire-retardant compositions to be applied by air and ground equipment.

In still another respects, the invention concerns compositions and methods of production thereof in which various components such as corrosion inhibitors, gum thickeners and coloring agents are maintained in suspension in the concentrate liquid and, upon dilution to produce the final fire-retardant composition, these components are uniformly dispersed or dissolved in the final composition.

The drawing is a schematic flow sheet illustrating the practice of my process for the preparation of my composition.

In my previously issued patent, No. 3,196,108, issued July 20, 1965, I disclosed the use of attapulgite clay as a component of a fire-retardant composition containing an electrolytic fire-suppressing salt such as ammonium sulphate, ammonium chloride, mono-ammonium phosphate or di-ammonium phosphate. More recently, attempts have been made to use so-called liquid ammonium polyphosphate concentrates as an aerially applied fire retardant. A principal difficulty encountered in the use of liquid polyphosphate as an aerially applied fire retardant is the inability to effectively color the composition so that such compositions will be visible from the air after application. Additionally, problems were encountered in preventing corrosion of the storage and application equipment because the corrosion inhibitors were insoluble in the polyphosphate concentrate. Similarly, when it was desired to adjust the viscosity of the final drop composition with gum thickeners such as algin, polysaccharides, carboxymethylcellulose, and the like, difficulties were encountered because these components were also insoluble in the ammonium polyphosphate concentrate, would settle out or form separate phases during storage of the concentrate and, upon dilution of the concentrate to form the final composition for aerial application, these components would not be uniformly dispersed or dissolved in the composition.

I have now discovered that coloring agents, thickeners and corrosion inhibitors can be effectively carried by attapulgite clay suspended in an ammonium polyphosphate liquid such that upon final dilution of the concentrate to form a fire-retardant composition for aerial application, the coloring agents, corrosion inhibitors and thickeners will be uniformly dispersed and/or dissolved in the final composition. This discovery enables one to use an iron oxide pigment as the coloring agent and is therefore highly advantageous since red iron oxide is the preferred pigment for use in aerially applied fire-retardant compositions because of its color, cost and persistance.

Briefly, in accordance with my invention, I provide a concentrate for the preparation of a fire-retardant composition especially adapted for aerial application, the concentrate consisting essentially of an ammonium polyphosphate liquid, attapulgite clay suspended in the concentrate liquid and a coloring agent carried by the attapulgite clay.

In accordance with a further embodiment of my invention, I provide a process for preparing a fire-retardant composition especially adapted for aerial application, the process comprising the steps of forming a concentrate which consists essentially of ammonium polyphosphate liquid, attapulgite clay suspended in the polyphosphate liquid and components carried by the attapulgite clay selected from the class consisting of corrosion inhibitors, thickeners and coloring agents, and thereafter mixing the concentrate with water in an amount to produce a viscous fire-retardant composition.

The liquid ammonium polyphosphate compositions useful in accordance with my invention are well known in the art and, illustratively, include the familiar 10–34–0, 11–37–0, 12–40–0 and 13–42–0 solutions which are commercially available from several sources.

In preparing the concentrate, the attapulgite clay 10 is mixed into the ammonium polyphosphate liquid 11 to form an intimate dispersion and suspension 12 of the clay in the liquid, and other desired components such as corrosion inhibitors 13, thickeners 14 or coloring agents 15 are then mixed into the clay-liquid suspension 12. The mixing of the components of the concentrate is preferably accomplished by high-shear action such as may be afforded by a Waring Blendor or by the impellers of high-speed recirculating pumps or by bladed high-speed disks.

Examples of corrosion inhibitors which may be effectively employed in the practice of my invention are sodium silicofluoride, sodium dichromate, potassium dichromate, chromic acid, sodium thiosulphate, and the like. The amount of corrosion inhibitor to be employed, if desired, will depend upon the specific inhibitor or inhibitor system selected and, illustratively, one can employ from about 0.05 to about 0.5 part by weight of potassium dichromate per 100 parts of the final fire-retardant composition.

For further adjustment of the final viscosity of the fire-retardant composition, one may employ various materials which are known as thickening agents in other prior art fire-retardant composition, such as guar gum, algin, polysaccharides, carboxymethylcellulose, and the like.

As mentioned above, red iron oxide is the preferred coloring agent, but the invention is not limited to the use of this particular coloring agent and, illustratively, one can employ various dyes or pigments such as Ultramarine Blue, Rhodamine B, Azo Red A, Naptho Orange, titanium dioxide, and the like. The amount of the coloring agent to be employed in the practice of the invention is, of course, dependent upon the desired intensity of coloration of the final fire-retardant composition. For example, in a preferred embodiment of the invention, I employ from about 0.25 to about 2 parts by weight of red iron oxide pigment per 100 parts of the final fire-retardant composition.

The attapulgite clays which are preferably and effectively employed in practicing my invention are commercially available materials designated "Minugel 200" and "AA Special." The amount of clay which is employed will vary with the particular ammonium polyphosphate liquid employed and will depend somewhat upon the desired viscosity of the concentrate. For example, in a preferred embodiment, I employ from about 7 to about 10 parts by weight of attapulgite clay per 100 parts of 11–37–0 polyphosphate used in preparing the concentrate.

After forming the concentrate 16 which consists of the ammonium polyphosphate liquid, attapulgite clay suspended therein and the desired components carried by the attapulgite clay, such as corrosion inhibitors, thickeners and coloring agents, the concentrate 16 can be stored for extended periods without appreciable separation of the components. Since all of the components of the final fire-retardant composition except water of dilution are present in the concentrate, transportation of the materials from the manufacturing facility to the application equipment loading site is facilitated. The concentrate may be stored at the loading site until needed and then finally diluted as desired with water 17 to produce the final fire-retardant composition 18 of desired viscosity just before the composition is loaded into the equipment for application at the fire site.

The amount of water of dilution employed to convert the concentrate to the final fire-retardant composition will vary widely depending upon the exact composition of the concentrate and the desired viscosity of the final composition. The desired viscosity will, in turn, depend on the type of vegetation to which the composition is ultimately to be applied, the expected drop altitude, wind conditions, etc. For example, one can employ from about 50 to about 90 parts by weight of water per 100 parts of the final fire-retardant composition.

The time of application of the material may vary. The compositions may be pre-applied at sites of expected fire hazards or the compositions may be applied directly to the fire or just ahead of the fire line during the progress of the fire.

The following examples are presented in order to illustrate the practice of my invention and the preferred embodiments thereof. All parts are expressed as parts by weight.

EXAMPLE 1

This example illustrates the preparation of a concentrate in accordance with my invention.

One part of Minugel 200 colloidal attapulgite clay is mixed in a Waring Blendor with 20 parts of 11–37–0 ammonium polyphosphate liquid until the clay is intimately and uniformly dispersed throughout the liquid. One part of red iron oxide pigment is then added to the blender and thoroughly mixed with the liquid-clay suspension.

EXAMPLE 2

In order to increase the viscosity of the final fire-retardant composition, if desired, 5 parts of a polysaccharide gum, commercially available from Stein, Hall & Co. as "Colloid AGC-2" can be mixed into 100 parts of the concentrate of Example 1.

EXAMPLE 3

The corrosive properties of the compositions of Examples 1 and 2 can be substantially reduced by further mixing therein 2 parts of sodium dichromate per 100 parts of the compositions of either Example 1 or Example 2.

EXAMPLE 4

This example illustrates the dilution of the concentrates of Examples 1, 2 or 3 to produce a final fire-retardant composition suitable for aerial application.

To a heavily forested area having a dense undergrowth, 100 parts of a concentrate prepared in accordance with Example 1 containing a thickener and a corrosion inhibiter in accordance with Examples 2 and 3 are diluted with 400 parts water and thoroughly mixed by the action of a high-speed proportioning pump connected to the concentrate storage and the water storage vessels. The resulting final retardant composition may be effectively applied to the forested area by dump dropping from a tanker aircraft at an altitude of 100 feet and at an air speed of 140 m.p.h. with wind conditions varying from 0 up to 20 m.p.h. without undue dispersion of the fire-retardant composition.

Having now fully described my invention and the presently preferred embodiments thereof, I claim:

1. In a method for preparing fire-retardant compositions especially adapted for aerial application, which method comprises the steps of forming an intermediate concentrate composition suitable for transportation and storage, said concentrate composition consisting essentially of water, thickening agents, an electrolytic fire-suppressing salt and other components such as coloring agents and corrosion inhibitors, and thereafter finally diluting said concentrate the additional water to form the final fire-retardant composition of preselected viscosity, the improvements in said method whereby ammonium polyphosphate liquids are employed to form a fire-retardant composition containing polyphosphate insoluble and non-suspendible components substantially uniformly suspended and dispersed in said fire-retardant composition, said improvements comprising the step of forming, by intimate mixing, a composition consisting essentially of (1) ammonium polyphosphate liquid, (2) at least one polyphosphate insoluble and non-suspendible component selected from corrosion inhibitors, thickeners and coloring agents and mixtures thereof, and (3) at least a sufficient quantity of attapulgite clay to carry each of said components substantially uniformly suspended in said concentrate, said normally insoluble and non-suspendible components being substantially uniformly suspended and dispersed in said fire-retardant composition.

References Cited

UNITED STATES PATENTS

| | | | |
|---|---|---|---|
| 3,196,108 | 7/1965 | Nelson | 252—2 |
| 3,634,234 | 1/1972 | Morgenthaler | 252—7 |
| 3,275,566 | 9/1966 | Langguth | 252—389 |
| 3,585,135 | 6/1971 | Smith et al. | 252—8.1 |
| 2,958,577 | 11/1960 | Aruan | 23—106 |
| 3,513,114 | 5/1970 | Hahn et al. | 260—8 |
| 3,245,904 | 4/1966 | Young | 252—7 |

GEORGE F. LESMES, Primary Examiner

W. R. DIXON, JR., Assistant Examiner

U.S. Cl. X.R.

252—2, 8.05; 106—15 FP